Patented Apr. 15, 1952

2,593,213

UNITED STATES PATENT OFFICE 2,593,213

PREPARATION OF ALPHA HYDROXY PHOSPHONATES

Alan R. Stiles, Berkeley, Calif., assignor to Shell Development Company, San Francisco, Calif., a corporation of Delaware No Drawing. Application October 26, 1948, Serial No. 56,667

20 Claims. (Cl. 260—461)

This invention relates to the production of esters of alpha hydroxy phosphonic acids. More particularly, the invention provides a novel process for the production of such esters in a single reaction step without the necessary employment of difficultly obtainable or corrosive reactants.

The esters of alpha hydroxy phosphonic acids are valuable for a wide variety of purposes, and several methods of producing them have been proposed. Such esters may be considered as derivatives of phosphorous acid $H_3PO_3$ in which all of the hydrogen atoms have been replaced by organic radicals the initial atoms of which are carbon atoms. Two of the radicals are attached to oxygen atoms, and the third is attached to phosphorus and bears a hydroxyl group on the initial carbon atom. Heretofore, the production of such phosphonates has usually required the use of a halogen derivative of phosphine in a reaction included within, or analogous to,

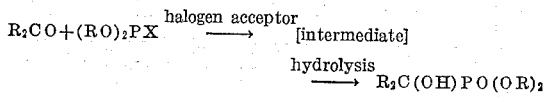

in which either aldehydes or ketones may be employed. The monoesters or the free acids have been prepared in a similar manner by employing the appropriate halogen derivatives of phosphine.

An object of the present invention is to provide a process for the direct production of alpha hydroxy phosphonates from carbonyl compounds by a process employing an ester of phosphorous acid rather than a readily hydrolyzable and corrosive halogen derivative of phosphine. Another object is to provide a general process for the synthesis of alpha hydroxy phosphonates. A further object of the invention is a process that is suitable for the conversion to phosphonates of carbonyl compounds which because of their low reactivity proved to be unsuitable starting materials for use in the methods of synthesis heretofore known. Still other objects and advantages of the present invention will be apparent from the following description.

Although the organic alcohol esters of inorganic acids are generally employed in chemical reactions only as sources of the radicals or ions into which they are readily decomposed, we have surprisingly discovered that the acid diesters of phosphorous acid interact as a unit and the entire molecule adds to the carbonyl group of various compounds. We have further discovered that contrary to what would be expected by analogy from the addition reactions of the halogen derivatives of phosphine with carbonyl compounds, the less reactive higher ketones may be employed under the same conditions used for the more reactive aldehydes when the addition is conducted in the presence of free radicals.

Substantially any carbonyl compound can be employed in the process of the invention. From compounds containing functional groups in addition to the carbonyl group, a wide variety of compounds containing one or more groups of the formula $C(OH)P(O)(OR)_2$, in which R is an organic radical, can be produced by the process of the invention.

For example, acid diesters of phosphorous acid such as dipropyl phosphite add in accordance with the process of the invention to halo derivatives of aldehydes such as chloral to form substituted phosphonates such as dipropyl 1-hydroxy-2,2,2-trichloroethane-1-phosphonate; to hydroxy carbonyl compounds such as diacetone alcohol to form substituted phosphonates such as dipropyl 2,4-dihydroxy-4-methylpentane-2-phosphonate; and to carbonyl compounds containing aliphatic carbon-to-carbon multiple bonds such as methyl vinyl ketone to form substituted phosphonates such as dipropyl 3-(dipropylphosphono)-3-hydroxybutane-1-phosphonate,

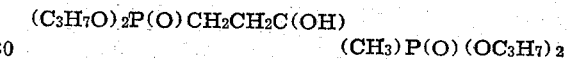

when the addition is conducted in the presence of free radicals, and dipropyl 2-hydroxy-3-butylene-2-phosphonate,

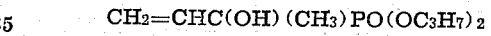

when the addition is conducted in the absence of free radicals (the addition of dialkyl phosphites to carbon-to-carbon double bonds in the presence of free radicals is described and claimed in the copending application of Stiles, Harman and Rust, Serial No. 20,608, filed April 12, 1948). In addition, the phosphites add, probably in the same manner, to ketenes. However, in this case an immediate ketonization takes place and the products are 1-oxophosphonates, e. g., dipropyl phosphite and ketene combined in accordance with the process of the invention produces dipropyl acetylphosphonate (dipropyl 1-oxoethane-1-phosphonate).

The hydrocarbyl alcohol (hydrocarbyl is employed to refer to a monovalent radical formed by the removal of a hydrogen atom from a hydrocarbon) esters of alpha hydroxy hydrocarbonphosphonic acids are a particularly valuable class of compounds which can be produced by the present process. Their production is accomplished by the reaction of a dihydrocarbyl phosphite with a carbonylhydrocarbon. The term "carbonylhydrocarbon" is employed to refer to compounds consisting of hydrocarbons in which the atoms have been rearranged and a carbonyl group (=C=O) incorporated in the molecule. The carbonylhydrocarbon is an aldehyde when one valency of the carbonyl group is satisfied by hydrogen, and is a ketone when both valencies are satisfied by carbon. Illustrative examples of carbonylhydrocarbons which are suitable for employment in the present process include aliphatic aldehydes such as heptaldehyde, crotonaldehyde, tiglic aldehyde, 5,5-dimethylhexanal, tetradecanal, 2-methyl-1-cyclohexenecarboxaldehyde and 3-methylnonadecanal; aliphatic ketones such as methyl ethyl ketone, octyl dodecyl ketone, pentyl isopropyl ketone, di-tertiary-butyl ketone, cyclohexylacetone, isophorone and 3-pentenyl butyl ketone; aromatic aldehydes such as benzaldehyde, the tolylaldehydes and cinnamyl aldehyde; the aromatic ketones such as acetophenone, benzophenone, benzyl butyl ketone, 4-phenyl-3-pentenyl methyl ketone and phenyl cyclohexyl ketone.

The carbonylhydrocarbons of from 1 to 20 carbon atoms which contain aliphatic multiple bonds only in the carbonyl groups (as typified by heptaldehyde, methyl ethyl ketone, benzaldehyde and acetophenone) comprise a preferred class of starting materials for the process of the invention. The term "aliphatic multiple bonds" is employed in its ordinary sense and means multiple bonds other than the unique "aromatic" unsaturation formed by cyclic conjugated multiple bonds typified by the multiple bonds in the benzene ring. Of the preferred class, the ketohydrocarbons, i. e., ketones that are carbonylhydrocarbons, are particularly preferred in that their employment in the presence of free radicals provides a practical method of forming in a single reaction step the esters of dihydrocarbylhydroxymethanephosphonic acids.

Illustrative examples of dihydrocarbyl phosphites which are suitable for employment in the process of the invention include aliphatic phosphites such as dipropyl phosphite, dibutyl phosphite, dioctyl phosphite, dieicosyl phosphite, propyl pentyl phosphite, dicyclohexyl phosphite, 3-pentyl butyl phosphite, di-2-cyclohexenyl phosphite and dicrotyl phosphite; and aromatic phosphites such as dibenzy phosphite, the ditolyl phosphites, diphenyl phospite and di-paracrotylphenyl phosphite.

The process of the invention in its essence consists of heating a carbonyl compound with an alcohol ester of phosphorous acid containing two alcohol residues. The reaction temperatures may suitably range from 0° C. to 200° C. but temperatures of from 80° C. to 150° C. are preferred. Although certain ketones as well as aldehydes react with dihydrocarbyl phosphites in the absence of reaction initiators, a preferred mode of conducting the process of the invention consists of bringing the carbonyl compound into contact with the phosphite in the presence of a free radial reaction initiator.

Free radicals can be formed in the reaction mixture in numerous ways. The reaction can be conducted in a vessel equipped for the transmission of light of short wave lengths while irradiated by a source of light having a wave length low enough to dissociate the carbonyl compound into free radicals, or to similarly dissociate an added component such as acetone. In addition, the free radicals may be formed by the dissociation of the numerous thermally dissociable compounds such as the peroxides, the metallo-alkyl compounds, the positive-halogen compounds, the diazo-compounds and the like.

Organic peroxides are the most suitable source of free radicals for employment in the present process. Thus, a particularly preferred embodiment of the present invention comprises the production of dihydrocarbylhydroxymethanephosphonates by reacting a ketohydrocarbon containing aliphatic multiple bonds only in the keto grouping with a dihydrocarbyl phosphite which is free of aliphatic multiple bonds in the presence of an organic peroxide at the decomposition temperature of the peroxide.

Organic peroxides are a class of compounds containing a peroxy group (—O—O—) both valencies of which are satisfied by organic radicals. The organic peroxides are characterized by having a well defined temperature range at which they decompose at a rapid but controllable rate into free radicals. Organic peroxides in which the initial carbon atom of at least one of the organic radicals attached to the peroxy group is a tertiary-carbon atom are particularly preferred in the present process. Illustrative examples of suitable organic peroxides and the recommended temperature range for their use, i. e., their decomposition temperature, include:

| | °C. |
|---|---|
| Diethyl percarbonate | 45 to 70 |
| Allyl percarbonate | 50 to 80 |
| Benzoyl peroxide | 70 to 80 |
| Acetyl peroxide | 70 to 90 |
| Beta-chlorobenzoyl peroxide | 85 to 95 |
| Methyl n-amyl ketone peroxide | 110 to 135 |
| Methyl isobutyl ketone peroxide | 110 to 135 |
| Ethyl peroxide | 125 to 145 |
| Methyl isobutyl peroxide | 130 to 150 |
| Dicyclohexyl peroxide | 150 |

The decomposition temperature of typical peroxides of the particularly preferred class include:

| | °C. |
|---|---|
| Di-tertiary-butyl diperoxalate | 0 to 40 |
| Di-tertiary-butyl dipermalonate | 20 to 60 |
| Tertiary-butyl perbenzoate | 75 to 115 |
| 2,2-bis(tertiary-butylperoxy)butane | 80 to 120 |
| Di-tertiary-butyl peroxide | 115 to 150 |

The reaction may be conducted in any apparatus which is suitable for containing and heating organic liquids. The operation of the process may be batchwise or continuous.

Lquid-phase operation is preferred. Pressure is not critical unless it is desired to employ reactants or solvents which are volatile at the selected reaction temperature. In general, reactants containing from 1 to 20 carbon atoms are preferred in the process and such reactants will form a liquid solution when combined at temperatures within the preferred range. However, where it is desired to employ reactants which are solid or immiscible at the reaction temperature an inert solvent can be employed. Suitable solvents include the paraffinic or aromatic hydrocarbons such as pentane, nonane, decane, benzene, toluene, and the like.

The proportions in which the reactants are employed can be varied widely. The reaction is productive of good yields when an equivalent amount of phosphite ester is used for each carbonyl group, and such proportions being most economical, are generally preferred. However, either the phosphite or the carbonyl compound may be employed in excess. Where a reaction initiator is employed, the reaction initiator (the compound forming the source of the free radicals) is preferably employed in from about 0.1 to 10 mole per cent based on the total number of moles of carbonylic and phosphite reactants. However, where the carbonyl compound is dissociated by light to form the source of the free radicals, it is preferably employed in amounts substantially equivalent to those required for a mole to mole reaction with the phosphite.

The following examples illustrate in detail the preparation of dihydrocarbyl alpha hydroxy phosphonates from various typical members of the suitable classes of reactants in accordance with various typical embodiments of the process. However, as many variations in the reactants and reaction conditions are within the scope of the invention, the invention is not to be considered as limited to the particular materials or reaction conditions recited in the examples.

*Example I.—Preparation of a dialkyl alpha hydroxy phosphonate from an aliphatic aldehyde in the absence of reaction initiators*

Dibutyl 1-hydroxyheptane-1-phosphonate is prepared by maintaining 19.4 grams (0.1 mole) of dibutyl phosphite and 11.4 grams (0.1 mole) of heptaldehyde at a temperature of 126–135° C. The phosphonate is isolated by vacuum distillation of the reaction mixture.

The rate of the reaction is illustrated by the rise of the refractive index observed for a solution of the above reactants treated in the above manner after the various periods of reaction.

| Time, (mins.) | Refractive Index |
|---|---|
| 0 | 1.4215 |
| 13 | 1.4290 |
| 55 | 1.4407 |
| 110 | 1.4416 |

A sample of the phosphonate prepared with a yield of 80% in the above manner was identified as dibutyl 1-hydroxyheptanephosphonate by the following analysis:

| | Found | Calculated for $C_{15}H_{33}O_4P$ |
|---|---|---|
| Percent Carbon | 51.1, 57.3 | 58.5 |
| Percent Hydrogen | 10.6, 10.8 | 10.7 |
| Percent Phosphorus | 10.6, 10.6 | 10.1 |
| Molecular Weight | 332±25 | 308 |

*Example II.—Preparation of a dialkyl alpha hydroxy phosphonate from an aliphatic ketone in the presence of a reaction initiator*

Dipropyl 2-hydroxybutane-2-phosphonate is prepared by maintaining 124.5 grams (0.75 mole) of dipropyl phosphite and 54.0 grams (0.75 mole) of methyl ethyl ketone in the presence of 6.8 cc. (5 mole per cent) of di-tertiary-butyl peroxide at 130° C. The phosphonate is isolated by a vacuum distillation of the reaction mixture.

The rate of the reaction is illustrated by the rise of the refractive index observed for a solution of the above reactants treated in the above manner after the various periods of reaction.

| Time-(hours) | Refractive Index |
|---|---|
| 0 | 1.4044 |
| 2 | 1.4080 |
| 4 | 1.4126 |
| 6 | 1.4158 |

At the end of 24 hours dipropyl 2-hydroxybutane-2-phosphonate was isolated by vacuum distillation and was identified by the following analysis:

| | Found | Calculated for $C_{10}H_{23}O_4P$ |
|---|---|---|
| Percent Carbon | 45.7, 45.8 | 50.4 |
| Percent Hydrogen | 8.9, 9.1 | 9.7 |
| Percent Phosphorus | 16.0, 15.9 | 13.0 |
| Molecular Weight | 286 | 238 |

*Example III.—Preparation of a dialkyl alpha hydroxy phosphonate from an aliphatic ketone in the absence of a reaction initiator*

Dipropyl 2-hydroxybutane-2-phosphonate is prepared by maintaining 124.5 grams (0.75 mole) of dipropyl phosphite and 54.0 grams (0.75 mole) of methyl ethyl ketone at 130° C. The phosphonate is isolated by vacuum distillation of the reaction mixture.

The rate of the reaction is illustrated by the rise of the refractive index observed for a solution of the above reactants treated in the above manner after the various periods of reaction.

| Time, (hours) | Refractive Index |
|---|---|
| 0 | 1.4050 |
| 2 | 1.4063 |
| 4 | 1.4086 |
| 6 | 1.4098 |

At the end of 6 hours the sample of dipropyl 2-hydroxybutane-2-phosphonate prepared in the above manner was isolated and found to be identical with the compound prepared in the manner described in Example II.

*Example IV.—Preparation of a dialkyl alpha hydroxy phosphonate from an aromatic aldehyde in the presence of a reaction initiator*

Dipropyl phenylhydroxymethanephosphonate is prepared by maintaining 31.8 grams (0.3 mole) of benzaldehyde and 49.8 grams (0.3 mole) of dipropyl phosphite in the presence of 5.5 cc. (5% by weight) of di-tertiary butyl peroxide at 120° C. in a closed vessel. The phosphonate is isolated by vacuum distillation of the reaction mixture.

The rate of reaction is illustrated by the rise of refractive index observed for the solution of the above reactants treated in the above manner for 22 hours. The refractive index rose from $n_D^{20}$ 1.4639 to 1.4908. Dipropyl phenylhydroxymethanephosphonate was isolated in a 54% yield by vacuum distillation and was identified by the following analysis:

| | Found | Calculated for $C_{13}H_{21}O_4P$ |
|---|---|---|
| Percent Carbon | 56.5, 56.3 | 57.3 |
| Percent Hydrogen | 7.9, 7.8 | 7.7 |
| Percent Phosphorus | 11.9, 11.9 | 11.4 |

*Example V.—Preparation of a dialkyl alpha hydroxy phosphonate from an aromatic ketone in the presence of a reaction initiator*

Dipropyl 1-hydroxy-1-phenylethane-1-phosphonate is prepared by maintaining 36.0 grams (0.3 mole) of acetophenone and 49.8 grams (0.3 mole) of dipropyl phosphite in the presence of 5.5 cc. (5% by weight) of di-tertiary-butyl peroxide at 120° C. in a closed vessel. The phosphonate is isolated by vacuum distillation of the reaction mixture.

The rate of reaction is illustrated by the rise in refractive index observed for a solution of the above reactants treated in the above manner for 8 hours at which time the additional 2.5 cc. of di-tertiary-butyl peroxide was added and the heating continued for 14 hours. The refractive index rose from $n_D^{20}$ 1.4627 to 1.4751 over a 22 hour period.

*Example VI.—Preparation of a diaryl alpha-hydroxy alpha-phosphonate from an aliphatic aldehyde in the presence of free radicals*

Diphenyl 1-hydroxy-3-methylbutane-1-phosphonate is prepared by maintaining 70.2 grams (0.3 mole) of diphenyl phosphite and 25.8 grams (0.3 mole) of isovaleryl aldehyde in a Pyrex vessel placed about six inches from the source of ultraviolet radiation at a temperature of 80° C. The phosphonate is isolated by the vacuum distillation of the reaction mixture.

The invention claimed is:

1. A process which comprises mixing dibutyl phosphite and heptaldehyde in about equimolar amounts, heating the mixture at temperatures of from about 80° C. to about 150° C. to effect reaction, and then recovering dibutyl 1-hydroxyheptane-1-phosphonate from the mixture.

2. A process which comprises mixing dipropyl phosphite and methyl ethyl ketone, heating the mixture at temperatures of from about 115° C. to about 150° C. in the presence of di-tertiary-butyl peroxide added in an amount corresponding to from about 0.1 to about 10 mole per cent of the amount of the reactants to effect reaction, and then recovering dipropyl 2-hydroxybutane-2-phosphonate from the mixture.

3. A process which comprises mixing dipropyl phosphite and benzaldehyde in about equimolar amounts, maintaining the mixture at temperatures of from about 115° C. to about 150° C. in the presence of di-tertiary-butyl peroxide added in an amount corresponding to from about 0.1 to about 10 mole per cent of the amount of the reactants to effect reaction, and then recovering dipropyl phenylhydroxymethanephosphonate from the mixture.

4. A process which comprises mixing a dialkyl acid ester of phosphorous acid and a saturated aliphatic aldehyde and maintaining the mixture at temperatures of from about 0° C. to 200° C. to effect reaction whereby there is produced dialkyl ester of a hydroxy-substituted saturated aliphatic phosphonic acid having both hydroxy and phosphorus directly substituted on a single carbon atom.

5. A process which comprises mixing a dialkyl acid ester of phosphorous acid and a saturated aliphatic ketone and maintaining the mixture at temperatures of from about 0° C. to 200° C. in the presence of an added organic peroxide to effect reaction whereby there is produced a dialkyl ester of a hydroxy-substituted saturated aliphatic phosphonic acid having both hydroxy and phosphorus directly substituted on a single carbon atom.

6. A process which comprises mixing a dialkyl acid ester of phosphorous acid and a carbonyl compound selected from the class consisting of aldehydes and ketones and heating the mixture at temperatures of from about 80° C. to about 150° C. to effect reaction whereby there is produced the corresponding diester of a hydroxy-substituted phosphonic acid having both hydroxy and phosphorus directly substituted on a single carbon atom.

7. A process according to claim 6 in which the reaction is promoted by a free radical reaction initiator.

8. A process according to claim 7 when the free radical reaction initiator is an organic peroxide.

9. A process which comprises mixing a dihydrocarbyl acid ester of phosphorous acid and a carbonyl compound selected from the class consisting of aldehydes and ketones and maintaining the mixture at temperatures of from about 0° C. to about 200° C. to effect reaction whereby there is produced the corresponding diester of a hydroxy-substituted phosphonic acid having both hydroxy and phosphorus directly substituted on a single carbon atom.

10. A process according to claim 9 in which the reaction is promoted by a free radical reaction initiator.

11. A process according to claim 10 when the free radical reaction initiator is an organic peroxide.

12. A process which comprises reacting a dialkyl acid ester of phosphorous acid with a carbonyl compound selected from the class consisting of aldehydes and ketones by heating a mixture comprising the same at temperatures of from about 80° C. to about 150° C. to produce the corresponding dialkyl ester of a hydroxy-substituted phosphonic acid having both hydroxy and phosphorus directly substituted on a single carbon atom.

13. A process according to claim 12 in which the reaction is promoted by a free radical reaction initiator.

14. A process according to claim 13 when the free radical reaction initiator is an organic peroxide.

15. A process which comprises reacting a dihydrocarbyl acid ester of phosphorous acid with a carbonyl compound selected from the class consisting of aldehydes and ketones at a temperature of from about 0° C. to about 200° C. to produce the corresponding diester of a hydroxy-substituted phosphonic acid having both hydroxy and phosphorus directly substituted on a single carbon atom.

16. A process which comprises reacting an acid diester of phosphorus acid with a ketone at a temperature of from about 0° C. to about 200° C. to produce the corresponding diester of a hydroxy-substituted phosphonic acid having both hydroxy and phosphorus directly substituted on a single carbon atom.

17. A process according to claim 16 in which the reaction is promoted by a free radical reaction initiator.

18. A process which comprises reacting an acid diester of phosphorous acid with an aldehyde at a temperature of from about 0° C. to about 200° C. in the presence of a free radical reaction initiator to produce the corresponding diester of a hydroxy-substituted phosphonic acid having both hydroxy and phosphorus directly substituted on a single carbon atom.

19. A process which comprises reacting an acid diester of phosphorous acid with ketene at a temperature of from about 0° C. to about 200° C. to produce the corresponding diester of a phosphonic acid having both oxygen and phosphorus directly substituted on a single carbon atom.

20. A process which comprises reacting a dialkyl acid phosphite with ketene at a temperature of from about 0° C. to about 200° C. to produce the corresponding dialkyl diester of a phosphonic acid having both oxygen and phosphorus directly substituted on a single carbon atom.

ALAN R. STILES.

REFERENCES CITED

The following references are of record in the file of this patent:

UNITED STATES PATENTS

| Number | Name | Date |
|---|---|---|
| 2,254,124 | Stevens | Aug. 26, 1941 |
| 2,439,214 | Lindsey | Apr. 6, 1948 |
| 2,400,800 | Hanford et al. | May 4, 1948 |

OTHER REFERENCES

Page, "Jour. Chem. Soc. (London)," vol. 101 (1912), pp. 423–431.

Marie, "Annales de chimie et de physique," 8th series, vol. 3 (1904), pp. 406–409, 429–432.